United States Patent Office 2,694,061
Patented Nov. 9, 1954

2,694,061

METHOD OF PRODUCING AMINOALCOHOL ESTERS OF PENICILLIN

Erling Knud Frederiksen, Holte, and Erling Juhl Nielsen, Charlottenlund, Denmark, assignors to Løvens kemiske Fabrik ved A. Kongsted, Copenhagen, Denmark, a firm No Drawing. Application November 27, 1951, Serial No. 258,513

Claims priority, application Denmark July 7, 1949

10 Claims. (Cl. 260—239.1)

This invention relates to a novel method for producing amino esters of penicillin, which method is relatively easily conducted and provides the esters in an easily purifiable form and in good yields.

This application is a continuation-in-part of our copending applications Serial Nos. 168,384 filed June 15, 1950 to benzyl aminoalkyl esters, and 246,148 filed September 11, 1951 to alkenyl aminoalkyl esters, the latter application being a continuation-in-part of the former, both now abandoned.

Several attempts have been made to esterify the carboxyl group of penicillin. The common method of reacting the silver salt with an alkyl iodide does not work, but some plain esters have been prepared by treating free penicillin with diazoalkanes.

In J. A. C. S. 70, pages 2964–66 (1948) there is described a method of converting the carboxyl group of benzyl penicillin into a basic group by preparing the anhydride of benzylpenicillin, reacting this anhydride with β-dimethylaminoethanol and isolating the β-dimethylaminoethylester as its crystalline hydrochloride. However, the preparation of the esters by this method is difficult and involves a loss of penicillin.

The principal object of the invention is to provide a simple and economical method of preparing amino esters of penicillin involving the reaction of a salt of penicillin and a halide of a trialkylamine including heterocyclicalkyl amines corresponding to the amino esters desired. The term "heterocyclic alkyl" is defined as an alkyl group substituted by a heterocyclic nitrogen-containing ring system joined to the alkyl group through nitrogen.

Other objects of the invention will appear from the following where a more detailed description of our invention is given, and further the invention is illustrated by a number of examples, but we wish it to be understood that our invention is not to be considered limited thereby.

In accordance with the invention, a salt of penicillin dissolved or suspended in a liquid reaction medium is reacted with a halide of a trialkylamine; the salt formed from the halogen of the trialkylene and the cation of the penicillin salt is removed from the reaction medium; and the ester is recovered, either as such or as an addition salt thereof.

Any soluble or insoluble penicillin salt may be employed, for example, potassium, ammonium, calcium, barium, silver, procaine, triethylamine or N-ethylpiperidine salt. While the halide of the trialkylamine will usually be the chloride, the other halides may be used, particularly the bromide.

While a salt of benzylpenicillin (penicillin G) will usually be employed and such salts will be more specifically referred to herein, a salt of any other penicillin may, if desired, be employed, for example, a salt of penicillin O, K, F, dihydro- F and X as well as salts of mixtures of various penicillins, for example, of a mixture obtained by submersed cultivation.

As stated the halide of the trialkylamine reacted with the penicillin salt will correspond to the amino ester desired, and such halide may be formed from the corresponding aminoalcohol. Such halide may be represented by the following formula:

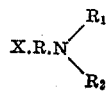

where X is halogen, preferably chlorine, where R is an alkylene bridge containing 2 to 4 carbon atoms, the hydrogen atoms of the —CH₂— of which may be substituted by alkyl groups containing from 1 to 6 carbon atoms, provided that the CH₂-group attached to the halogen atom contains at least one unsubstituted hydrogen atom, the total number of carbon atoms of the substituents not exceeding 6, and where R₁ and R₂ are selected from the group consisting of alkyl groups and radicals which together with the nitrogen atom form a heterocyclic ring. Preferably when the alkylene bridge (R) will contain from 2 to 3 carbon atoms and when the bridge contains substituents these will be alkyl groups containing from 1 to 4 carbon atoms, the total number of carbon atoms of the substituent groups not exceeding 4. So far as the present method is concerned, the type and length of the groups R₁ and R₂ are immaterial.

For illustrative purposes R₁ and R₂ may be selected from the group consisting of alkyl groups containing from 1 to 12 carbon atoms and radicals which with N form a 5 to 6-membered ring of a mono- or dicyclic radical, the other members of the ring in which the N occurs being selected from the group consisting of —CR₁R₂, >CR₃, where R₁, R₂ and R₃ are selected from the group consisting of hydrogen and alkyl groups containing 1 to 6 carbon atoms, N, NR₄, O and S in a monocyclic radical, R₄ being an alkyl group consisting from 1 to 6 carbon atoms, and the same and a pair of adjacent carbon atoms of a phenyl ring in a dicyclic radical. Preferably, when R₁ and R₂ are non-cyclic alkyl groups they will contain from 1 to 4 carbon atoms.

In the case of R₁ and R₂ being alkyl groups typical halides of the trialkylamines reacted with the penicillin salts are the following, chlorine, exemplifying the halogen: β-chloroethyl-methylethylamine; β-chloroethyl-diethylamine; β-chloroethyl-methyl-n-propylamine; β-chloroethyl-ethyl-n-propylamine; β-chloroethyl-di - n - propylamine; β-chloroethyl-methylisopropylamine; β-chloroethyl - ethylisopropylamine; β-chloroethyl - diisopropylamine, β-chloroethyl-methyl-n-butylamine; β-chloroethyl-isopropyl-n-butylamine; β-chloroethyl-di-n-butylamine; β-chloroethyl-butylisobutylamine; β-chloroethyl-diisobutylamine; β-chloroethyl-cyclopentylmethylamine; β-chloroethyl-cyclohexylethylamine; 1-dimethylamino-2-chloropropane; 1-methylethylamino-2-chlorobutane; 1-chloro-2-diethylaminobutane; 1-ethyl-n-propylamino - 2 - chloropropane; 2-methyl-n-butylamino-4-chloropentane; 2-chloro-3-di-n-propylaminopentane; 1-cyclopenthylethylamino-1,1-dimethyl-2-chloroethane; 1-cyclohexylmethylamino-1-methyl-2-ethyl - 2 - chloroethane; 1 - dimethylamino-3-chloropropane; 1-di-n-propylamino-2-ethyl-3-chloropropane; 1-methyl-n-propylamino-1,1-dimethyl-3-chloropropane and 1-methyl-lauryl-2-chloroethane.

The following are examples of R₁ and R₂ when forming with the nitrogen a heterocyclic ring: piperidine; alkyl substituted piperidine, where the total of carbon atoms in the substituents does not exceed 14, such as dimethylpiperidine, tetramethylpiperidine and hexylpiperidine or butylethylpiperidine; N-methyl and N-ethyl substituted piperazine; pyrrolidine; morpholine; imidazoline; thiazolidine; tetrahydroquinoline; isindoline; indoline; and oxazolidine; tetrahydroisoquinoline.

Typical examples of chlorides of heterocyclicalkyl amines which can be used in the present process are the following: 1-piperidino-2-chloroethane; 1-(2'-hexylpiperidino) - 2 - chloroethane; 1-(2',2',4',6'-tetramethylpiperidino) - 2 - chloroethane; 1 - (2',6'-dimethylpiperidino)-2-chloroethane; 1 - (1',2',3',4' - tetrahydroisoquinolino)-2-chloroethane; 1-pyrrolidino-2-chloroethane; 1-imidazolino - 2-chloroethane; 1-N-methylpiperazino-2-chloroethane; 1-N-ethylpiperazino-2-chloroethane; 1-piperidino-3-chloropropane; 1-piperidino-4-chlorobutane; 1-piperidino-3-chloropentane; 1-thiazolidino-2-chloroethane; 1-morpholino-2-chloroethane; 1-(1',2',3',4'-tetrahydroquinolino)-2-chloroethane; 1-piperidino-2-chlorooctane; 1-isindolino-2-chloroethane; 1-indolino-2-chloroethane; 1-oxazolidino-2-chloroethane; 1-morpholino-2,2-dimethyl-3-chloropropane and 1-(3'-ethylbenzimidazolino)-2-chloroethane.

Referring further to the procedure a penicillin salt is suspended or dissolved in a suitable liquid reaction medium in which the ester formed is soluble, such as one of the lower alcohols, for instance methanol, ethanol or isopropanol; a ketone such as acetone, methylethyl ketone, di-isopropylketone and acetylacetone; hydrocarbons, such as benzene, toluene, xylene and chlorinated hydrocarbons, such as chloroform or carbon tetrachloride; dimethyl- or diethyl-acetamide or tetrahydrofuran and the like. The halide may then be added, preferably in excess, for example 5 to 10 per cent, after which the mixture is allowed to react under agitation by stirring or shaking, if desired. The temperature at which the reaction takes place may be varied as desired, so long as it is not sufficiently high to cause decomposition of the penicillin salt or the penicillin ester formed. Generally, the reaction will be conducted between about room temperature (about 20° C.), although it may be 10° C. or lower, and about 80° C. Preferably, the reaction is conducted under reflux at a temperature between about 40° C. and about 70° C. under which conditions good yields of the product will generally be obtained in from ½ to 5 hours. The reaction may be illustrated by the following equation using sodium penicillin and diethylaminoethyl chloride as typical.

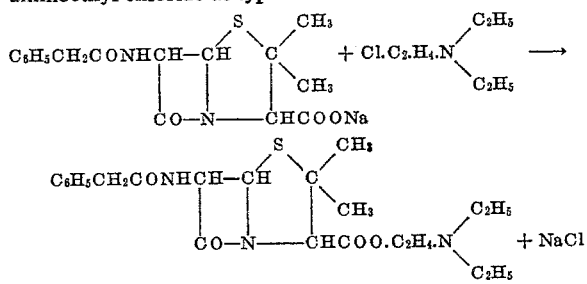

The reaction may be further illustrated by the following equation using sodium penicillin and N-(β-chloroethyl)-piperidine as typical:

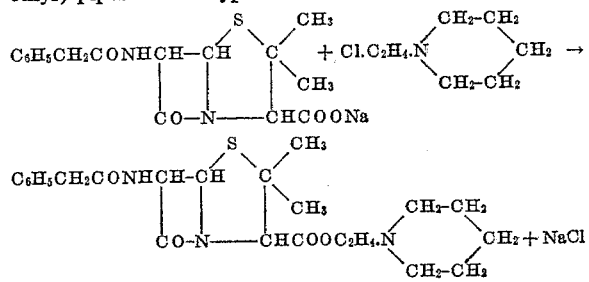

It has been found that the rate of reaction may be increased, when a chloride or bromide of the amine is used, by the addition of a soluble iodide to the reaction medium in which the ester is formed. While the use of sodium iodide is preferred, other soluble iodides such as potassium, ammonium or calcium iodide may be employed. In general, the amount of soluble iodide added, based on the weight of the chloride or bromide, will be between about 3 per cent and about 20 per cent, preferably between about 10 to 15 per cent.

The sodium chloride or other salt formed by the reaction is removed by filtration or other suitable means. When it is desired to isolate the ester, it may be obtained by evaporation of the solvent from the solution in which the ester is formed, or preferably it is obtained by treatment of a soluble salt of the ester, such as the hydrochloride or citrate, with an alkaline material, such as caustic soda, followed by extraction with an organic solvent, in which the ester is soluble, and evaporating the solvent.

If it is desired to recover the ester in the form of a salt, the acid corresponding to the salt desired is desired directly to the medium in which the reaction takes place, for example, the acid is added in an alcoholic solution. If the ester is desired in the form of a difficultly water-soluble salt, such salt is advantageously prepared by adding an aqueous solution of a salt containing the acid residue of the difficultly soluble salt desired to the medium containing a soluble salt of the ester, preferably after dilution of the medium with water. The soluble and difficultly soluble salts may be recovered from the medium in which they are formed by appropriate means such as evaporation, filtration and the like.

By way of examples of acids which may be used in this procedure of salt formation the following are mentioned, primary salts only being contemplated in the case of polybasic acids; except in the case of sulfuric acids, where only neutral salts are contemplated; hydrochloric; hydrobromic; hydroiodic; nitric; phosphoric; sulphuric; acetic; propionic; butyric; lauric; oleic; stearic; benzoic; naphtoic; o-aminobenzoic; p-aminobenzoic; o-iodobenzoic; p-hydroxybenzoic; benzenesulphonic; toluenesulphonic; cinnamic; citric; fumaric; lactic; malic; maleic; mandelic; salicylic; p-aminosalicylic; acetylsalicylic; o-aminosalicylic; succinic and tartaric acids and penicillin.

By way of example of soluble salts which advantageously can be used in the above named procedure to obtain difficultly soluble penicillin aminoalcohol ester salts, the soluble iodides such as sodium potassium, ammonium or calcium iodide may be mentioned.

The novel esters and salts which may be prepared by the above described method are not claimed herein, but are the subject matter of our co-pending applications Serial Nos. 258,511 filed November 27, 1951, to hydroiodide salts of dialkylaminoalkyl esters; 258,512 filed November 27, 1951, to dialkylaminoalkyl esters, now abandoned; 258,514 filed November 27, 1951, to heterocyclic aminoalkyl esters; and 258,515 filed November 27, 1951, to quarternary derivatives of alkylaminoalkyl esters.

These applications contain additional examples of the method described herein.

*Example 1*

12 ccs. of diethylaminoethyl chloride are added to a suspension of 22 grams of the sodium salt of benzylpenicillin in 300 ccs. of anhydrous acetone. The mixture is agitated mechanically for 2 days at room temperature. The precipitated sodium chloride is removed by filtration, and from the filtrate acetone is evaporated in vacuum until the volume is 50 ccs. Then 300 ccs. of petroleum ether are added. After standing in ice for 3 hours the petroleum ether is decanted from the separated oil, and the latter is washed with 50 ccs. of petroleum ether. The oil is then subjected to distillation to remove traces of petroleum ether, and consists of substantially pure benzylpenicillin-diethylaminoethyl ester.

To produce a salt, the oil is dissolved in 20 ccs. of anhydrous alcohol, and to the latter solution a solution of hydrogen chloride in ether is added while cooling and stirring until a sample diluted with water has pH=6. Now 200 ccs. of amyl acetate are added to the clear solution after which the penicillin-diethylaminoethylester-hydrochloride crystallises. After standing at 0° C. for 3 hours this salt is removed by filtration. The yield is 20.4 grams, viz. 70 per cent of the theoretical. The melting point is 147–148.5° C. and the nitrogen contents 8.9 per cent as compared to the theoretical of 8.94 per cent. Assayed against *Staphylococcus aureus* the substance possesses 1200 units per milligram.

The penicillin-diethylaminoethylester-hydroiodide, which is difficultly soluble in water, may be prepared in a manner similar to that used by the hydrochloride, but is more easily prepared by adding a solution of a soluble iodide, such as potassium iodide, to one of the soluble salts of penicillin-diethylaminoethylester, such as the hydrochloride or the phosphate. Thereby the hydroiodide of the penicillin-diethylaminoethylester is crystallizing out, which has a melting point of 173–174° C. after drying. Assayed against *Staphylococcus aureus* it possesses 1000 units per milligram.

*Example 2*

7.44 kilograms of the potassium salt of penicillin are suspended in 40 liters of acetone (water content 1–1.7 per cent). 3 liters of diethylaminoethyl chloride are added, and the mixture is refluxed for 1½ hours.

After cooling, precipitated potassium chloride is removed by filtration, and the filtrate is evaporated in vacuum (70–80 mm. of mercury) until the temperature in the distillation vessel has been raised to 30–35° C. Then the residue is poured into a mixture of 20 liters of water, 10 kilograms of ice and 1.28 liters of 85 per cent phosphoric acid.

Thereby a pale-yellow solution is obtained which is filtered under sterile conditions and cooled to 0° C. During 2–3 hours 40 liters of a sterile 20 per cent solution of potassium iodide are added with stirring. After addition, the stirring is continued for another ½ hour at 0° C.

The crystalline precipitate of benzylpenicillin-β-diethylaminoethyl ester-hydroiodide is separated from the liquid by filtration, washed with 10 liters of cold, sterile water and dried in vacuum at 40° C. The yield is from 9.5 to 10 kilograms.

Example 3

2 grams of the potassium salt of benzylpenicillin are suspended in 20 ccs. of dimethylacetamide and 1 gram of diethylaminoethyl chloride is added. The mixture is shaken for 20 hours at room temperature. After removal of potassium chloride by filtration, the mixture is evaporated in vacuum to a syrup, which is then dissolved in 15 ccs. of anhydrous alcohol, and hydrogen chloride in alcoholic solution is added, until a sample dissolves clearly in water, the solution having neutral reaction. On adding ether and rubbing with a spatula, the penicillin - diethylaminoethylester - hydrochloride crystallizes out. Melting point 147–148.5° C.

Example 4

2 grams of the triethylamine salt of benzylpenicillin are heated for 2 hours on a steam bath with 1 cc. of diethylaminoethyl chloride and 20 ccs. of acetone. After removal of triethylamine-hydrochloride by filtration, the mixture is treated as described in Example 1.

Example 5

2 grams of procaine-benzylpenicillin are heated for 4 hours on a steam bath with 1 cc. of diethylaminoethyl chloride and 20 ccs. of acetone. The precipitated procaine-hydrochloride is removed by filtration, and the mixture is treated as described above.

Example 6

24.6 grams of the sodium salt of benzylpenicillin are boiled for 40 hours on the steam bath with 14.9 grams of dimethylaminoethyl chloride and 350 ccs. of acetone. After cooling, sodium chloride is removed by filtration, and the reaction mixture is evaporated in vacuum (the temperature of the bath is to be kept below 30° C.) to a volume of about 50 ccs. The residue is precipitated with 250 ccs. of petrol ether, and the precipitated oil is removed by decantation and washed twice with 50 ccs. of petrol ether, after which the oil is dissolved in 75 ccs. of anhydrous alcohol. Now 22.5 ccs. of a 2.5-normal solution of hydrogen chloride dissolved in anhydrous alcohol are added gradually, until a sample dissolves clearly in water with neutral reaction, and by cooling and rubbing, the hydrochloride of benzylpenicillin-dimethylaminoethylester crystallizes out. Further quantities may be won by adding ether to the mother liquor. Melting point 148–149° C.

Example 7

10 grams of the sodium salt of benzylpenicillin are boiled on the steam bath for 20 hours with 6.5 ccs. of 1-dimethylamino-2-chloropropane and 200 ccs. of dry acetone. After removal of sodium chloride by filtration, the solution is evaporated in vacuum at a low temperature (less than 30° C.). The residue is washed with extraction gasoline and dissolved in 50 ccs. of anhydrous alcohol. The solution is neutralized with an alcoholic solution of hydrogen chloride as described above. On addition of ether a white amorphous substance precipitates, which is washed with ether and dried in vacuum. The substance is very hygroscopic and decomposes by heating.

Example 8

Benzylpenicillin - methyllaurylaminoethylester - hydrochloride is prepared from 13 grams of the sodium salt of penicillin and 13 grams methyllaurylaminoethyl chloride in 175 ccs. of dry acetone as described in Example 7. It is a white amorphous substance with a potency of about 1000 i. u. per milligram.

Example 9

20 grams of the sodium salt of benzylpenicillin are suspended in 300 ccs. of anhydrous acetone and 10.6 grams of N-(β-chloroethyl)-piperidine are added. The mixture is left standing for 3 days at room temperature while stirring. After removal of sodium chloride by filtration the filtrate is evaporated in vacuum at a low temperature (less than 30° C.) till it becomes a syrup, and this is dissolved in 15 ccs. of benzene. On addition of petroleum ether an oil is precipitated which is washed repeatedly with petroleum ether. Then the oil is dissolved in 25 ccs. of anhydrous alcohol and neutralized with an alcoholic solution of hydrogen chloride (a sample dissolves clearly in water by neutral reaction). On addition of dry ether a syrup is separated which solidifies when washed with additional ether. The reaction product is benzylpenicillin-piperidinoethylester-hydrochloride which is an amorphous substance decomposing on heating.

Example 10

A mixture of 59.9 grams (0.161 mole) potassium salt of benzylpenicillin, 25.4 grams (0.171 mole) of β-morpholinoethyl chloride and 325 ccs. of acetone (containing 0.25 per cent water) is refluxed for about 25 hours.

The potassium chloride formed is filtered off and the filtrate is evaporated in vacuum. Ether is added to the residue, and the resulting solution is filtered, whereafter the ether is removed by distillation, and the residue is dissolved in anhydrous ethanol.

Alcoholic hydrochloric acid is then added until the pH-value of a sample diluted with water is about 5. On addition of dry ether a syrup is separated which solidifies when washed with additional ether. The product is benzylpenicillin-β-morpholinoethyl ester-hydrochloride which can be re-crystallized from a mixture of methanol and ether. Melting point 137–138° C.

Example 11

35.6 grams of the sodium salt of penicillin are suspended in 250 ml. of dry boiling acetone and 6.45 grams of dimethylaminoethyl chloride are added.

After refluxing for ½ hour a further 3.2 grams of dimethylaminoethyl chloride are added and another 3.2 grams added after 2 hours refluxing. This method is employed because the dimethylaminoethyl chloride polymerizes very easily.

After refluxing for 8 hours (total) the mixture is filtered, and the filtrate is evaporated in vacuum to a syrup.

The residue is triturated with petrol ether to remove excess of dimethylaminoethyl chloride and after this treatment it is dissolved in 200 ml. of anhydrous ethanol.

After addition of an alcoholic solution of hydrochloric acid (until a sample diluted with water shows pH=5) and 100 ml. of dry ether, the solution stands at 0° C. over night. On dilution of the solution with water and addition of 20 per cent more than the calculated amount of a potassium iodide solution the hydroiodide is obtained in a yield of 67 per cent and with melting point 185–186° C.

Example 12

To a suspension of 7.4 grams of the potassium salt of benzylpenicillin in 40 ccs. of acetone, 4.1 grams of di-n-butylaminopropyl chloride and 0.1 gram of sodium iodide are added. The mixture is refluxed for 3½ hours. After cooling, potassium chloride is removed by filtration. The filtrate is evaporated in vacuum to half its volume, and 2 volumes of ether are added. Precipitated impurities are removed by filtration, and the filtrate is evaporated to a syrup. The residue is dissolved in 50 ccs. of acetone and a solution of 4.0 grams of the monohydrate of citric acid in 20 ccs. of acetone is added. On addition of 100 ccs. of ether, the amorphous benzylpenicillin-1-di-n-butylaminopropyl ester-citric is precipitated. Yield: 8.9 grams (66 per cent of the theoretical).

We claim:

1. The method of producing amino esters of penicillin which comprises reacting, in a liquid reaction medium, a salt of penicillin and a halide having the following formula:

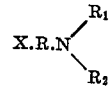

where X is halogen, where R is alkylene containing 2 to 4 carbon atoms in a straight chain, any substituents in the alkylene bridge being alkyl groups containing from 1 to 6 carbon atoms, the carbon attached to the halogen carrying at least one hydrogen atom, the total number of carbon atoms of the substituents not exceeding 6, and where $R_1$ and $R_2$ are selected from the group consisting of alkyl radicals and radicals which together with the N form piperidino, morpholino, N-alkyl piperazino in which the alkyl in N-alkyl has from 1 to 2 carbons, and pyrrolidino rings, separating the salt formed from the halogen and the cation of the penicillin salt, and recovering the ester formed.

2. The process of claim 1 wherein a soluble iodide is present in the reaction medium at the time of the reaction.

3. The process of claim 1 wherein the ester is recovered by evaporating the reacting medium.

4. The method of claim 1 wherein the ester in the form of an addition salt is recovered by converting the ester in the reaction mixture into an addition salt of said ester by the addition of an acid corresponding to the salt desired.

5. The process of claim 1 wherein the ester is recovered by converting the ester in the reaction mixture into an addition salt of the ester by the addition of an acid, and treating said salt with an alkali to convert the salt into the ester.

6. The method of producing amino esters of penicillin which comprises reacting, in a liquid medium, a salt of benzylpenicillin and a chloride having the formula

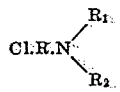

where R is alkylene containing 2 to 3 carbon atoms in a straight chain, any substituents in the alkylene bridge being alkyl groups containing from 1 to 6 carbon atoms, the carbon attached to the halogen carrying at least one hydrogen atom, the total number of carbon atoms of the substituents not exceeding 6, and where $R_1$ and $R_2$ are alkyl radicals containing from 1 to 12 carbon atoms, separating the chloride salt formed with the cation of the penicillin salt from the ester formed in the reaction, and recovering the ester.

7. The process of claim 6 wherein a soluble iodide is present in the reaction medium at the time of the reaction.

8. The process of claim 6 wherein the ester is recovered by evaporating the reaction medium.

9. The process of claim 6 wherein the ester in the form of an addition salt is recovered by converting the ester in the reaction mixture into an addition salt of said ester by the addition of an acid corresponding to the salt desired.

10. The process of claim 6 wherein the ester is recovered by converting the ester in the reaction mixture into an addition salt of the ester by the addition of an acid, and treating said salt with an alkali to reconvert the salt into the ester.

References Cited in the file of this patent

UNITED STATES PATENTS

| Number | Name | Date |
|---|---|---|
| 2,219,796 | Viaud | Oct. 29, 1940 |
| 2,578,570 | McDuffie et al. | Dec. 11, 1951 |

OTHER REFERENCES

Carpenter: "J. Am. Chem. Soc.," vol. 70 (1948), pp. 2964–5.

Kirchner et al.: "J. Org. Chem.," vol. 14, May 1949, pp. 390–2.